US008897580B2

(12) United States Patent
Su et al.

(10) Patent No.: US 8,897,580 B2
(45) Date of Patent: Nov. 25, 2014

(54) ERROR DIFFUSION WITH COLOR CONVERSION AND ENCODING

(71) Applicant: Apple Inc., Cupertino, CA (US)

(72) Inventors: Yeping Su, Sunnyvale, CA (US); Jiefu Zhai, San Jose, CA (US); James Oliver Normile, Los Altos, CA (US); Hsi-Jung Wu, San Jose, CA (US); Hao Pan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 13/664,359

(22) Filed: Oct. 30, 2012

(65) Prior Publication Data

US 2014/0029846 A1 Jan. 30, 2014

Related U.S. Application Data

(60) Provisional application No. 61/677,387, filed on Jul. 30, 2012.

(51) Int. Cl.
*G06K 9/36* (2006.01)

(52) U.S. Cl.
USPC ............................ 382/232; 382/233; 382/166

(58) Field of Classification Search
USPC ......... 382/162, 166, 167, 254, 275, 232, 233, 382/181, 190, 199; 345/605, 616, 597; 348/624; 714/762
See application file for complete search history.

(56) References Cited

U.S. PATENT DOCUMENTS

| | | | | |
|---|---|---|---|---|
| 6,441,867 | B1 * | 8/2002 | Daly | 348/607 |
| 6,654,887 | B2 * | 11/2003 | Rhoads | 713/176 |
| 7,411,707 | B2 | 8/2008 | Ikeda | |
| 2011/0164829 | A1 | 7/2011 | Moribe | |
| 2011/0285714 | A1 | 11/2011 | Swic et al. | |
| 2012/0050815 | A1 | 3/2012 | Kodama et al. | |

* cited by examiner

*Primary Examiner* — Anh Do
(74) *Attorney, Agent, or Firm* — Kenyon & Kenyon, LLP

(57) ABSTRACT

YCbCr image data may be dithered and converted into RGB data shown on a 8-bit or other bit display. Dither methods and image processors are provided which generate the banding artifact free image data during this process. Some methods and image processors may applying a stronger dither having a same mean with a larger variance to the image data before it is converted to RGB data. Others methods and image processors may calculate a quantization or encoding error and diffuse the calculated error among one or more neighboring pixel blocks.

21 Claims, 5 Drawing Sheets

ERROR DIFFUSION WITH COLOR CONVERSION AND ENCODING

CROSS-REFERENCE TO RELATED APPLICATIONS

The present application claims the benefit of U.S. Provisional Application Ser. No. 61/677,387 filed Jul. 30, 2012, entitled "ERROR DIFFUSION WITH COLOR CONVERSION AND ENCODING." The aforementioned application is incorporated herein by reference in its entirety.

BACKGROUND

Many electronic display devices, such as monitors, televisions, and phones, are 8-bit depth displays that are capable of displaying combinations of 256 different intensities of each of red, green, and blue (RGB) pixel data. Although these different combinations result in a color palette of more than 16.7 million available colors, the human eye is still able to detect color bands and other transition areas between different colors. These color banding effects can be prevented by increasing the color bit depth to 10 bits which is capable of supporting 1024 different intensities of each of red, green, and blue pixel data. However, since many display device devices only support an 8-bit depth, a 10-bit RGB input signal must be converted to an 8-bit signal to be displayed on a display device.

Many different dither methods, such as ordered dither, random dither, error diffusion, and so on, have been used to convert a 10-bit RGB input signal to 8-bit RGB data to reduce banding effects in the 8-bit RGB output. However, these dither methods have been applied at the display end, only after image data encoded at 10 bits has been received and decoded at 10 bits. These dither methods have not been applied to dithering 10-bit YCbCr to 8-bit YCbCr data before the 8-bit data is encoded and transmitted to a receiver for display on an 8-bit RGB display device.

One of the reasons that these dither methods have not been applied to dithering 10-bit YCbCr data before transmission is that many of the international standards that define YCbCr to RGB conversion cause loss of quantization levels in the output, even in the input and the output signals have the same bit depth. This may occur because the conversion calculation may map multiple input quantization levels into a same output level. The loss of these quantization levels during conversion from YCbCr to RGB negates the effects of applying a dither when converting a 10-bit signal to an 8-bit signal. As a result, the output images may contain banding artifacts.

There is a need to generate display images that do not contain banding artifacts when applying a dither during a bit reduction process as part of a conversion from YCbCr to RGB color space.

DETAILED DESCRIPTION

In an embodiment of the invention, YCbCr pixel data may be dithered and converted into 8-bit RGB data, which may be shown on a 8-bit display free of banding artifacts. Some methods and image processors generate display data that is free of banding artifacts by applying a stronger dither having a same mean with a larger variance to image data before conversion to RGB data. Other methods and image processors calculate a quantization or encoding error for a given pixel block and diffuse the calculated error among one or more neighboring pixel blocks. These options are discussed in more detail below.

Dither in Excess of Truncated Pixels

Prior random dither methods added dither noise to each of the three color channels before dropping bits in a quantization level reduction module. The dither noise that was added corresponded to the number of noise levels that the dropped bits could generate. For example, when the quantization level reduction is from 10 bits to 8 bits, the dither noise contains four possible digits: 0, 1, 2, and 3 with equal probabilities.

These random dither methods did not account for the further loss of quantization level loss when converting from YCbCr color space to RGB color space, even if the bit depth remained the same in both color spaces. Thus, the past random dither methods would have dithered 8-bit YCbCr data without banding, but the final 8-bit RGB output would include banding because of the loss of quantization level during the color space conversion.

To compensate for the loss of quantization levels during the color space conversion process, embodiments of the present invention may apply a dither noise to each of the three color channels that exceeds the number of levels corresponding to the dropped bits. For example, when the net quantization level is being reduced by two bits, such as by dropping two bits to get from a 10-bit input to an 8-bit signal, the applied dither noise may contain eight possible digits: −2, −1, 0, 1, 2, 3, 4, and 5, instead of the four digits in the past methods which were limited to a range having $2^n$ values, where n is the number of bits being dropped. Other quantities of additional digits may be added in other embodiments.

These additional digits may be selected so that the mean of the new noise is the same as the mean in past random dither methods, while the variance of the new noise is increased. In some instances, each of digits may have an equal probably of being selected. The possibility for strong dither noise, given the greater noise variance makes it less likely that data at different input quantization levels will map to the output level during the conversion process.

Figure 1:
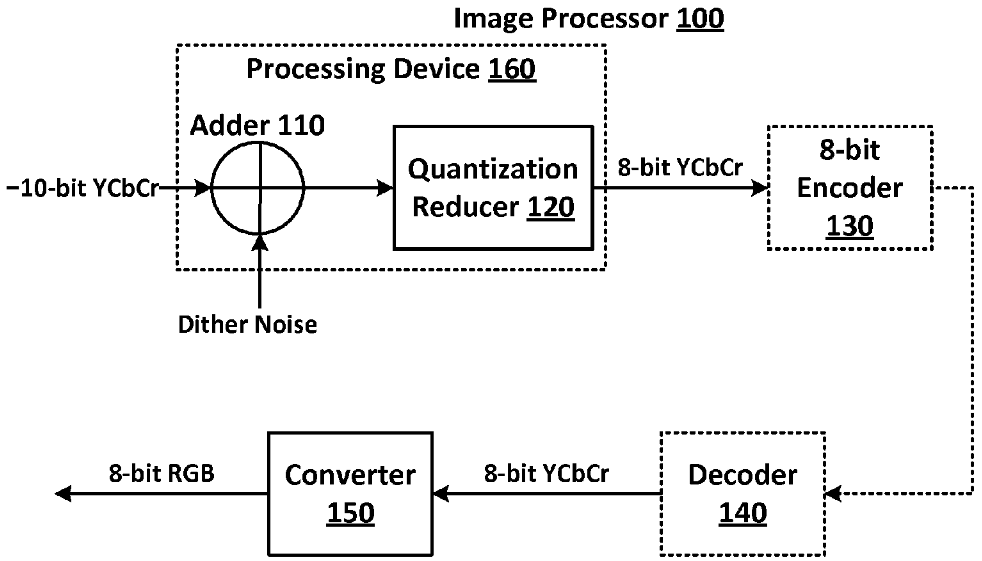
FIG. 1 shows a first exemplary configuration of an image processor in an embodiment of the invention.

FIG. 1 shows a first exemplary configuration of an image processor 100 in an embodiment of the invention. An image processor 100 may include one or more of an adder 110, quantizer 120, encoder 130, decoder 140, and converter 150. In some instances, a processing device 160 may perform computation and control functions of one or more of the adder 110, quantizer 120, encoder 130, decoder 140, and converter 150. The processing device 160 may include a suitable central processing unit (CPU). Processing device 160 may instead include a single integrated circuit, such as a microprocessing device, or may comprise any suitable number of integrated circuit devices and/or circuit boards working in cooperation to accomplish the functions of a processing device.

The adder 110 may include functionality for adding a dither noise component to YCbCr image data. In this example, the YCbCr image data is shown as being 10-bits, but in different embodiments, other bit lengths may be used. Once the dither has been added to the YCbCr image data, a quantizer 120 may reduce the number of quantization levels of the YCbCr data. In some instances, this reduction may occur through decimation, but in other embodiments, different reduction techniques may be used. In this example, the 10-bit YCbCr image data is shown as being reduced to 8-bit YCbCr data to be outputted on an 8-bit display, but in different embodiments other bit lengths may be used.

An encoder 130, which may be an 8-bit encoder if the YCbCr data is 8 bits, may then encode the YCbCr data for transmission to the display. A decoder 140 may decode the received transmitted data. A converter 150 may converted the decoded 8-bit YCbCr data to 8-bit RGB data for display on an 8-bit display device.

Figure 2:
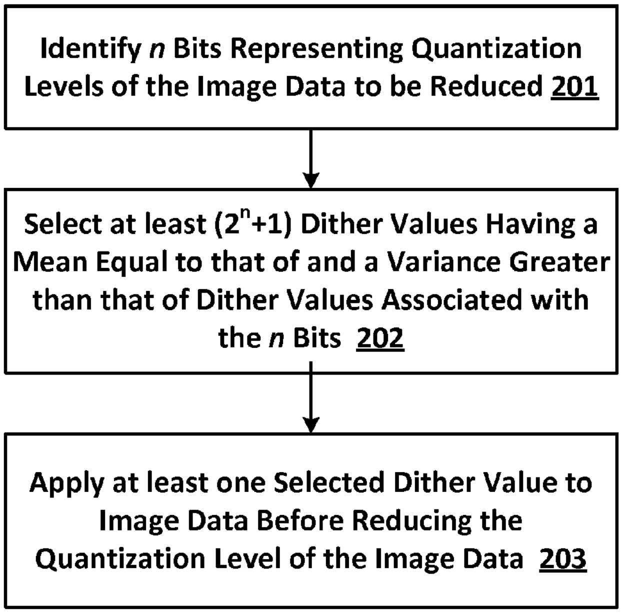
FIG. 2 shows an exemplary process for adding a strengthened dither in an embodiment of the invention.

FIG. 2 shows an exemplary process for adding a strengthened dither in an embodiment of the invention. In box 201, a number of bits n representing quantization levels of the image data reduced during image processing may be identified. In some instances, the image data may be 10-bit YCbCr data that is reduced during the image processing to 8-bit YCbCr data. The number n may be 2 in this instance. In other instances, X-bit YCbCr image data may be reduced and converted to Y-bit RGB image data during image processing, where X>Y.

In box 202, at least $(2^n+1)$ dither values may be selected using a processing device. The selected dither values may be chosen so that they have a mean equal to that of the dither values associated with the n truncated bits and a variance greater than that of the dither values associated with the n truncated bits. In some instances, one or more of the dropped bit values may be included in the set of at least $(2^n+1)$ dither values selected in box 202. In some instances, the dropped bit values may be a subset of the values included in the set of at least $(2^n+1)$ dither values selected in box 202. The dither values associated with the n truncated bits may include a quantity of $2^n$ or fewer dither values.

In some instances, the selected dither values in box 202 may include a set of $2^{n+1}$ dither values, so that if 2 bits are dropped, eight dither values may be selected in box 202, whereas in the prior art only four dither values were selected. The eight selected dither values may include −2, −1, 0, 1, 2, 3, 4, and 5 and the set of four prior art dither values may include values 0, 1, 2, and 3.

In box 203, at least one of the selected dither values may be applied to the image data before reducing the quantization levels of the image data using the processing device. The selected dither values may be scaled before being applied to the image data.

Quantization Error Diffusion

Another option for avoiding banding is to diffuse a quantization error among its neighboring pixels. This may be accomplished by calculating a quantization error that is caused by dropping bits during a requantization operation, such as when converting 10 bit image data to an 8 bit format used by a display, and then diffusing the quantization error into neighboring pixels. The quantization error may be diffused by scaling the error by a factor and then adding the scaled amount to the pixel values of respective neighboring pixels.

The quantization error may be calculated in the RGB space rather than in the YCbCr color space. The calculation may be performed in the RGB space to avoid banding artifacts in the RGB space. A quantization error calculated in the YCbCr space may be unable to prevent banding artifacts caused by the color space conversion.

Figure 3:
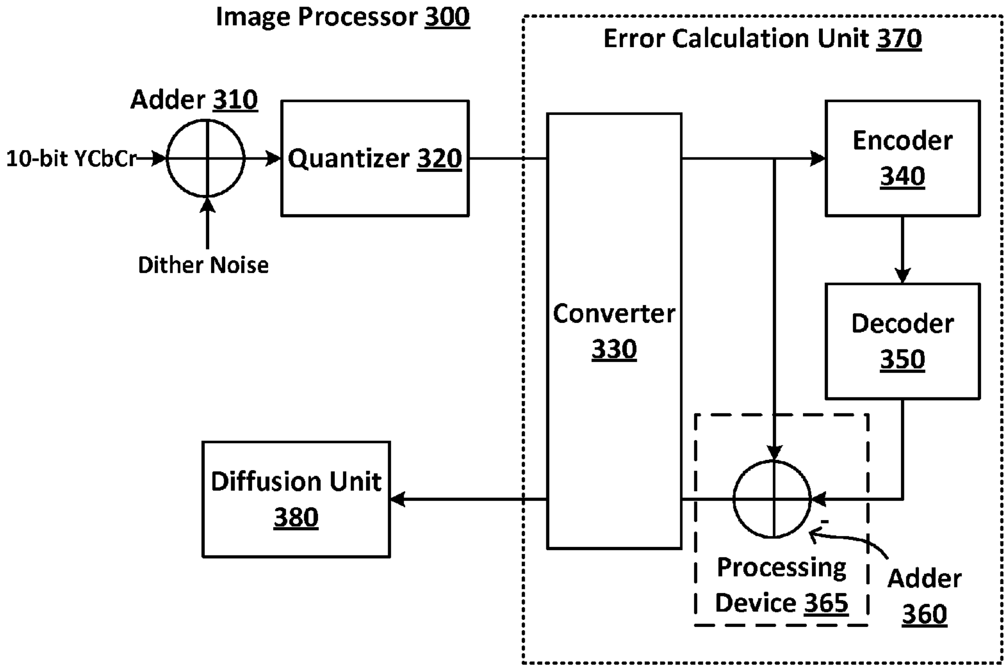
FIG. 3 shows a second exemplary configuration of an image processor in an embodiment of the invention.

FIG. 3 shows a second exemplary configuration of an image processor 300 in an embodiment of the invention. An image processor 300 may include one or more of a first adder 310, quantizer 320, converter 330, encoder 340, decoder 350, a second adder 360, processing device 365, error calculation unit 370, and diffusion unit 380. In some instances, the processing device 365 may perform computation and control functions of one or more of these components 310 to 380. The processing device 365 may include a suitable central processing unit (CPU). Processing device 365 may instead include a single integrated circuit, such as a microprocessing device, or may comprise any suitable number of integrated circuit devices and/or circuit boards working in cooperation to accomplish the functions of a processing device.

The quantizer 320 may reduce a quantization level of YCbCr pixel data. The error calculation unit 370 may calculate RGB pixel values of the YCbCr pixel data before and after the quantization level is reduced, calculate the quantization error in a RGB color space from a difference between the before and the after RGB pixel values, and convert the RGB quantization error to a YCbCr color space. The diffusion unit 380 may incorporate the converted YCbCr quantization error in at least one neighboring pixel block. The converter 330 may convert pixel data between YCbCr and RGB color spaces. The second adder 360 may calculate the difference between the before and the after RGB pixel values.

The encoder 340 may encode an original pixel block. The decoder 350 may generate a reconstructed pixel block from the encoded pixel block data. The processing device 365 and/or adder 360 may calculate a difference between values of the original pixel block and the reconstructed pixel block and then applying an error function to the difference to calculate an error statistic. The diffusion unit 380 may incorporate the error statistic in at least one value of at least one neighboring pixel block to the original pixel block.

In an exemplary method, the quantization error may be first calculated in the RGB color space. The quantization error of R, G, and B channels may then be converted to the error of Y, Cb, and Cr channels by the color space conversion. Finally, the errors of Y, Cb, and Cr may be diffused to the Y, Cb, and Cr of neighboring pixels.

Figure 4:
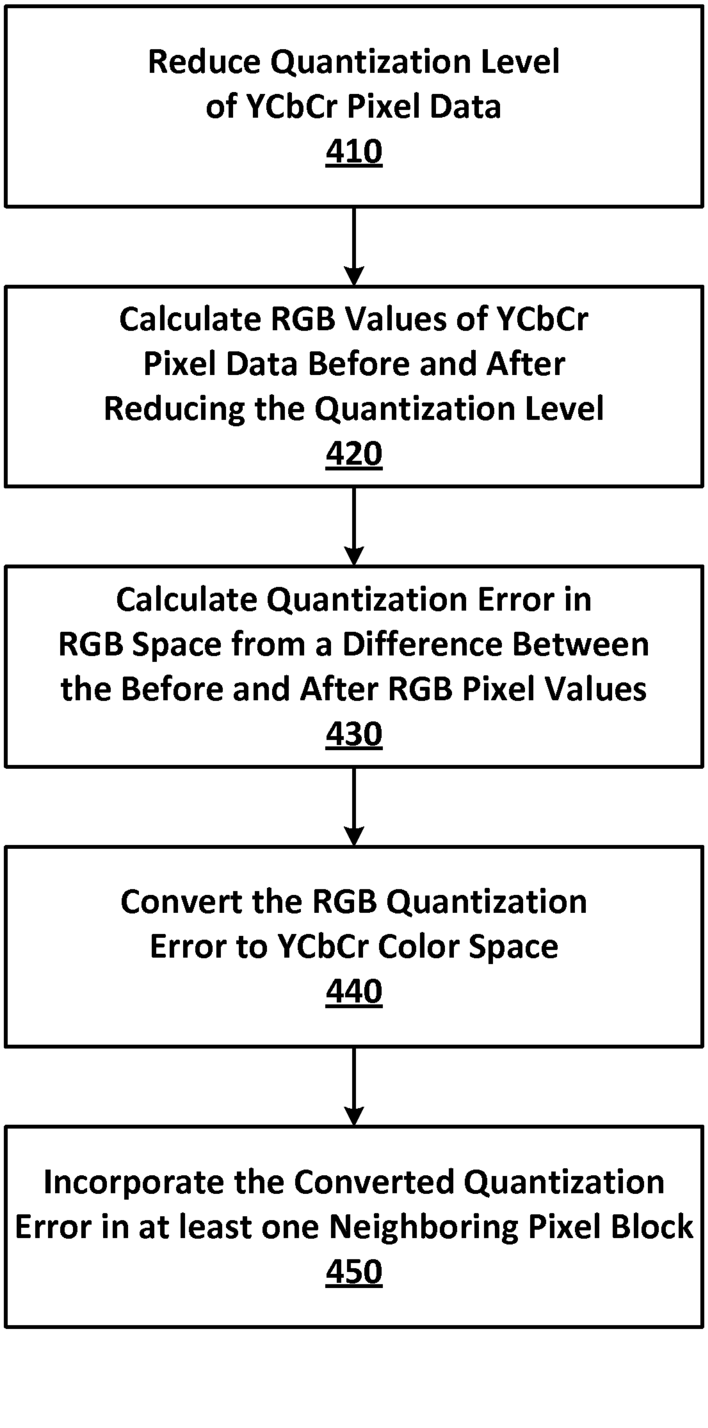
FIG. 4 shows an exemplary process for calculating and diffusing a quantization error in an embodiment of the invention.

FIG. 4 shows an exemplary process for calculating and diffusing a quantization error. In box 410, a quantization level of YCbCr pixel data may be reduced. For example, an 8-bit YCbCr (YCbCr_8 bit) value may be obtained by dropping the last two bits of a 10-bit YCbCr (YCbCr_10 bit) value of the current pixel.

In box 420, RGB pixel values of the YCbCr pixel data may be calculated before and after reducing the quantization level using a processing device. For example, an 8-bit RGB (RGB_8 bit) value may be calculated from YCbCr_8 bit using the following equation (1) shown below, where $M_{3\times3}$ and $N_{3\times1}$ are respect user selected 3×3 and 3×1 matrices, some of which may be selected from a set of international standards. Similarly, a floating point RGB value (RGB_floating) may be calculated by applying equation (1) to the original data YCbCr_10 bit.

$$\begin{bmatrix} R \\ G \\ B \end{bmatrix} = M_{3\times3}\begin{bmatrix} Y \\ Cb \\ Cr \end{bmatrix} + N_{3\times1} \quad (1)$$

In box 430, a quantization error may be calculated in a RGB color space from a difference between the before and the after RGB pixel values. For example, a quantization error Error_RGB=RGB_floating−RGB__8 bit may be calculated in the RGB color space from the results in box 420.

In box 440, the RGB quantization error may be converted to a YCbCr color space using a processing device. For example, the quantization error Error_RGB may be converted back to the YCbCr color space (Error_YCbCr) using the following equation (2) shown below:

$$\begin{bmatrix} Y \\ Cb \\ Cr \end{bmatrix} = M_{3\times3}^{-1}\left(\begin{bmatrix} R \\ G \\ B \end{bmatrix} - N_{3\times1}\right) \quad (2)$$

In box 450, the converted YCbCr quantization error may be incorporated in at least one neighboring pixel block.

Encoding Error Diffusion

As discussed previously, the lossy encoding process may reduce quantization levels in image areas with smooth color transition gradients. Error diffusion may be applied in the encoding loop in order to distribute a reconstruction error into one or more neighboring areas.

Figure 5:
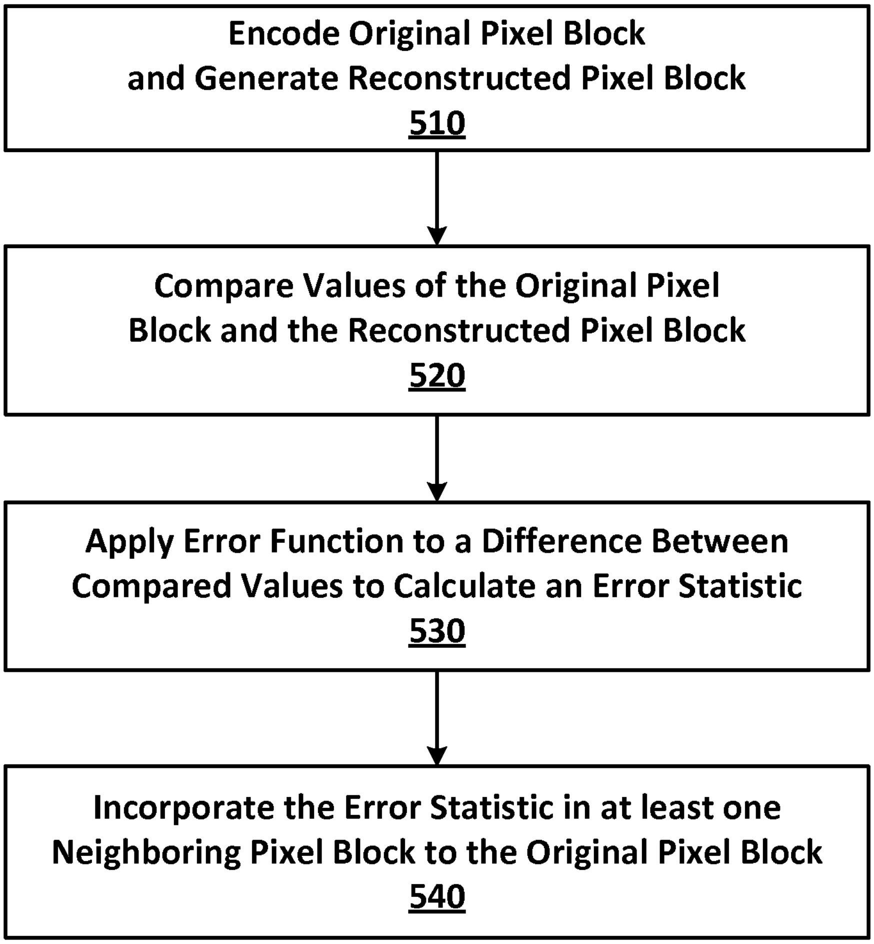
FIG. 5 shows an exemplary process for calculating and diffusing an encoding error in an embodiment of the invention.

FIG. 5 shows an exemplary process for calculating and diffusing an encoding error. In box 510, an original pixel block (orig_block_i) may be encoding and a reconstructed pixel block (rec_block_i) may be generated from the encoded pixel block using a processing device.

In box 520, values of the original pixel block and the reconstructed pixel block may be compared.

In box 530, an error function may be applied to a difference between the compared values of the original pixel block and the reconstructed pixel block to calculate an error statistic for block i (E_i) using the processing device. For example, error statistic E_i may be computed from the coding noise by applying an error function ƒ(orig_block_i−rec_block_i) to the difference between the original values block and the reconstructed block for the respective block:

$$E\_i = f(\text{orig\_block\_}i - \text{rec\_block\_}i) \quad (3)$$

In box 540, the error statistic may be incorporated in at least one value of at least one neighboring pixel block to the original pixel block. A neighboring pixel block may include any pixel block within a predetermined vicinity of the original pixel block. For example, the error may be distributed into one or more subsequent neighboring blocks (block_j) according to the function:

$$\text{block\_}j = \text{block\_}j + w_{i,j} \cdot g(E\_i) \quad (4)$$

The function g(E_i) may generate a compensating signal such that ƒ(g(E_i))≈E_i. For example, in an embodiment E_i may be an average and function ƒ( ) may compute a mean or average. In this embodiment, function g( ) may simply generate a block with identical values. In another embodiment E_i may be a transform coefficient and function ƒ( ) may compute a specific transform coefficient. In this embodiment, function g( ) may compute the corresponding inverse transform. In yet another embodiment E_i may be the n-th moment, and function ƒ( ) may compute the moment. In this embodiment, function g( ) may be an analytical generating function. The above algorithms for functions ƒ( ) and g( ) may also be applied in instances involving multiple statistics, such as when E_i is a vector of multiple statistics.

Figure 6:
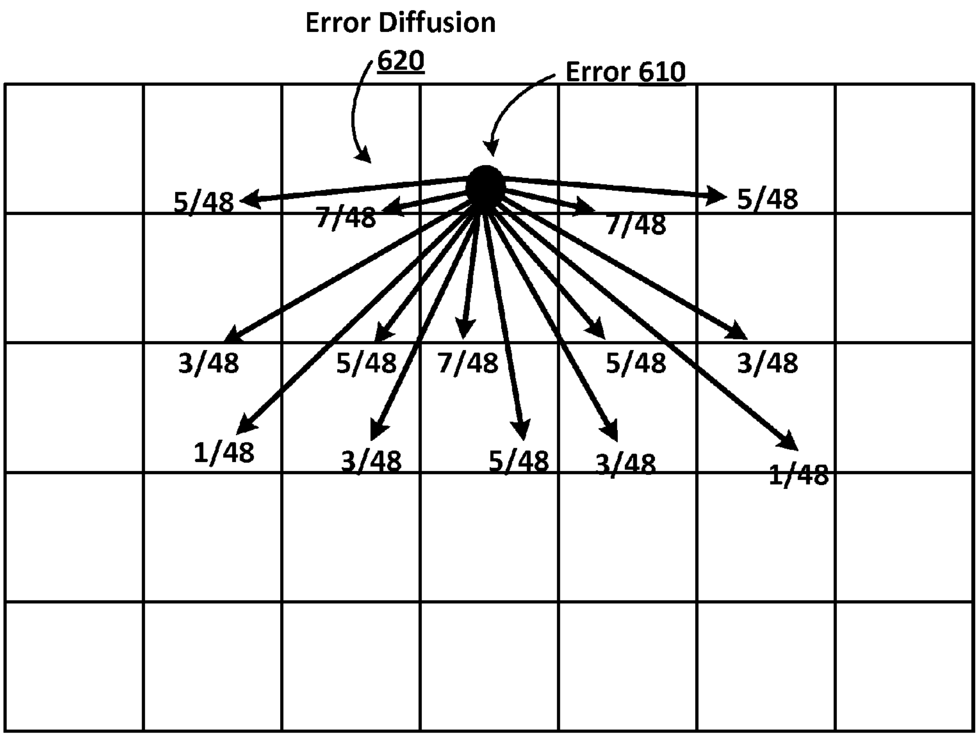
FIG. 6 shows an example of how an error may be diffused in an embodiment of the invention.

The diffusion coefficients $w_{i,j}$ may determine the distribution of error E_i to each neighboring block_j. In one embodiment, coefficients $w_{i,j}$ may be a fixed set of numbers. Coefficients $w_{i,j}$ may also vary depending on the sizes of block_i and/or block_j. In other instances, coefficients $w_{i,j}$ may vary depending on the spatial connectivity between block_i and block_j, FIG. 6 shows an example of how an error 610 in one pixel block may be diffused 620 and incorporated in the values of one or more neighboring pixel blocks as function of the spatial distance between the respective blocks. For example, closest neighbor blocks are weighted by a factor of 7/48, while those progressively further away may be weighted by lesser factors such as 5/48, 3/48, and 1/48. Other diffusion and error incorporation techniques may be used in other embodiments.

Coefficients $w_{i,j}$ may also vary based on a detection map indicating whether a block_i and/or block_j are part of an area subject to banding. If the two blocks are not in a similar area subject to banding, the coefficients $w_{i,j}$ for those blocks may be set to smaller values or zeroed out.

Coefficients $w_{i,j}$ may also be determined depending on the amount of texture and/or perceptual masking in the neighborhood or vicinity of block_i and/or block_j. If the neighborhood, is highly textured and/or has a high masking value, the coefficients $w_{i,j}$ may be set to smaller values or zeroed out. A perceptual mask may indicate how easily a loss of signal content may be observed when viewing respective blocks of an image.

Coefficients $w_{i,j}$ may be determined based on a relationship between original block values orig_block_i and orig_block_j. For example, coefficients $w_{i,j}$ may be lowered when the mean of the two blocks are far apart.

In some instances, the sum of all coefficients $w_{i,j}$ for a given block_i may equal one but need not equal one. In some instances, factors other than one may be used. Each of the blocks, such as block_i and block_j, may be defined as a coding unit, a prediction unit or a transform unit. In different instances, different criteria or considerations may be used to determine how the error will be diffused.

Figure 7:
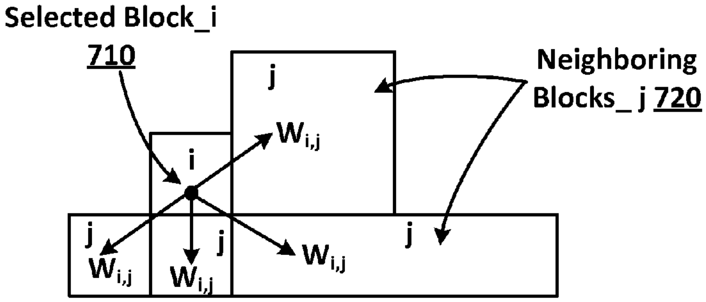
FIG. 7 shows an example of how different block sizes and amounts of diffusion may be applied in an embodiment of the invention.

For example, in an embodiment the diffusion may be associated with a block size selection, where the amount of diffusion as well as the block size used are controlled by spatial gradients or detection maps indicating whether a particular block is part of a banding area. An example of this is shown in FIG. 7, where a first block_i 710 is selected to have a first block size while some of its neighboring blocks_j 720 are selected to have different block sizes. The coefficients $w_{i,j}$ for each of the neighboring blocks_j 720 may also vary according to the spatial gradients, detection maps, and/or other criteria.

In another embodiment the diffusion may only be carried out on neighboring transform units with small transform sizes, or on transform units within a unit, such as a coding or prediction unit.

In each of these instances, an error may be diffused among neighboring coding blocks. However, the same diffusion principle may also be applied within a given coding block. Several exemplary embodiments are described below for diffusion within a transform block. For example, after transform encoding and decoding, a reconstruction error of a given pixel may be diffused to neighboring pixels within the same transform unit. The diffusion process and encoding process may be iterative so that a diffusion also modifies the original signal before further encoding. Diffusion may also be carried out in the transform domain, where a quantization error may be assigned transform coefficient that are diffused to other transform coefficients.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may refers to converting 10-bit YCbCr image data to 8-bit RGB image data, however other embodiments may convert different types of image data between different bit sizes.

We claim:

1. A dithering method comprising:

encoding an original pixel block and generating a reconstructed pixel block therefrom;

comparing values of the original pixel block and the reconstructed pixel block;

applying an error function to a difference between the compared values to calculate an error statistic using a processing device; and incorporating the error statistic in at least one value of at least one neighboring pixel block to the original pixel block.

2. The method of claim 1, wherein the error statistic is incorporated in the at least one neighboring pixel block according to the following: block_j=block_j+$w_{i,j}$·g(E_i), where:

block j is a neighboring pixel block to the original pixel block i,

E_i is the error statistic for the original pixel block i, $w_{i,j}$ is a diffusion coefficient specifying a distribution of the error statistic E_i to each neighboring pixel block j of the original pixel block i, and g( ) is a compensation function generating a compensation signal returning the error statistic E_i when the error function is applied to the compensation function g(E_i).

3. The method of claim 2, wherein E_i is an average error for the original pixel block i, the error function calculates a mean, and the compensation function generates a block with identical values.

4. The method of claim 2, wherein E_i is a transform coefficient for the original pixel block i, the error function calculates a special transform efficient, and the compensation function generates an inverse transform.

5. The method of claim 2, wherein E_i is an n-th moment for the original pixel block i, the error function calculates a moment, and the compensation function is an analytical generating function.

6. The method of claim 2, wherein E_i is a vector of more than one error statistic.

7. The method of claim 2, wherein $w_{i,j}$ is a fixed set of numbers.

8. The method of claim 2, wherein $w_{i,j}$ varies depending on a size of at least one of the block i and the block j.

9. The method of claim 2, wherein $w_{i,j}$ varies depending on a spatial connectivity between the block i and the block j.

10. The method of claim 2, wherein $w_{i,j}$ varies depending on a difference between the block i and the block j.

11. The method of claim 10, wherein $w_{i,j}$ is set to a lower value when a difference between a mean of the blocks i and j exceeds a threshold.

12. The method of claim 2, further comprising:

identifying whether the blocks i and j are in a same banding area;

setting $w_{i,j}$ to a first value when the blocks i and j are in the same banding area; and setting $w_{i,j}$ to a second value smaller than the first value when the blocks i and j are not in the same banding area.

13. The method of claim 2, further comprising:

identifying an amount of texture in a neighborhood of at least one of the blocks i and j;

setting $w_{i,j}$ to a first value when the identified texture amount exceeds a threshold; and setting $w_{i,j}$ to a second value higher than the first value when the identified texture amount does not exceed the threshold.

14. The method of claim 2, further comprising:

identifying an amount of perceptual masking in a neighborhood of at least one of the blocks i and j;

setting $w_{i,j}$ to a first value when the identified masking amount exceeds a threshold; and setting $w_{i,j}$ to a second value higher than the first value when the identified masking amount does not exceed the threshold.

15. The method of claim 1, further comprising selecting a block size and a quantity of neighboring pixel blocks incorporating the error statistic based on whether a block is detected as part of a banding area.

16. The method of claim 1, further comprising incorporating the error statistic in only those neighboring pixel blocks having transform units with transform sizes that are less than a threshold value.

17. The method of claim 1, further comprising incorporating the error statistic in only those neighboring pixel blocks having transform units within a coding unit.

18. The method of claim 1, further comprising incorporating the error statistic in only those neighboring pixel blocks having transform units within a prediction unit.

19. A dithering method comprising:

encoding an original pixel block and generating a reconstructed pixel block therefrom;

comparing values of the original pixel block and the reconstructed pixel block;

applying an error function to a difference between the compared values to calculate an error statistic using a processing device; and incorporating the error statistic for a selected pixel in the original pixel block in at least one neighboring pixel value to the selected pixel in the original pixel block.

20. The method of claim 19, further comprising iteratively repeating the method for a plurality of selected pixels and a plurality of original pixel blocks.

21. The method of claim 19, further comprising incorporating a calculated error statistic transform coefficient for the selected pixel in a corresponding transform coefficient of the at least one neighboring pixel value in a transform domain.

* * * * *